April 13, 1965   M. T. ORINIK   3,178,288
PHOTOGRAPHIC FILM HAVING IMPROVED FLEXIBILITY
Filed Aug. 23, 1961
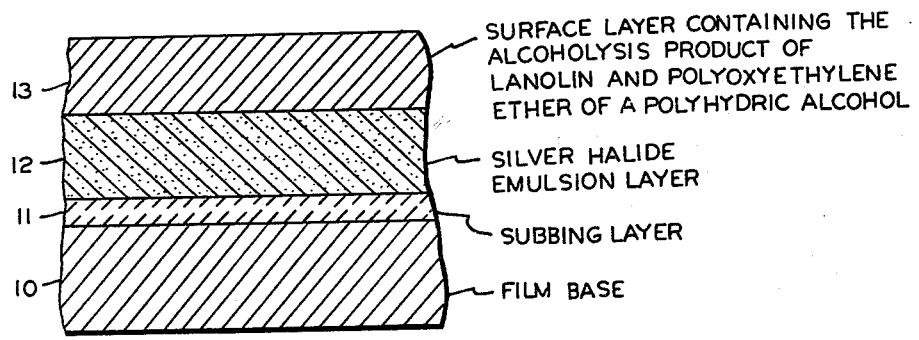
*INVENTOR.*
MICHAEL T. ORINIK
BY Henry W. Coughlin
Edward T. Gilhooly
Robert H. Zappert
ATTORNEY & AGENT

United States Patent Office 3,178,288
Patented Apr. 13, 1965

3,178,288
PHOTOGRAPHIC FILM HAVING IMPROVED FLEXIBILITY
Michael T. Orinik, Chenango Bridge, N.Y., assignor to General Aniline & Film Corporation, New York, N.Y., a corporation of Delaware
Filed Aug. 23, 1961, Ser. No. 133,504
4 Claims. (Cl. 96—87)

This invention relates to photographic film having improved flexibility and to the compositions used in preparing this film.

Photographic materials, in general, employ gelatin as a hydrophilic colloidal material for the preparation of the silver halide emulsion layers, antihalation layers, non-curling layers and surface layers. Although gelatin has excellent properties for the preparation of these light-sensitive materials, it suffers from the very serious disadvantage of imparting excessive brittleness to the whole film structure. This brittleness manifests itself in a tendency of the film to break when flexed. Many attempts have been made to improve the flexibility of gelatin and the film materials prepared from gelatin coatings. For instance, it has been proposed to modify gelatin chemically by esterification or by copolymerization with vinyl, acrylic or styrene monomers in order to render the gelatin more flexible. It has also been proposed to add to the gelatin prior to coating a latex such as prepared by the copolymerization of ethyl acrylate, acrylonitrile and acrylic acid. These attempts to improve the flexibility of gelatin have usually been unsatisfactory because many of these additives are optically and mechanically incompatible with the gelatin, thus resulting in haziness of the final film or coagulation of the suspension before the gelatin has dried.

In many instances, these resins impart improved flexibility to the emulsion layers to which they are added so long as these materials are used under conditions of high humidity. However, as soon as the humidity is sufficiently low such as experienced in desert climates or under the conditions of low humidity prevailing in heated rooms during the winter months, the flexibility decreases drastically and the materials display pronounced brittleness.

It is, therefore, an object of my invention to provide photographic film which has improved flexibility and decreased brittleness. Another object of my invention is to provide gelatin compositions which when coated out and dried do not cause any loss in optical properties. Other objects of my invention will be apparent from the following description.

I have found that the flexibility of photographic materials can be improved and their brittleness reduced by overcoating a photographic film comprising a plastic suitable support, a subbing layer and a silver halide gelatin emulsion layer with a surface coating, which contains in addition to gelatin, the condensation product of ethylene oxide and lanolin or preferably the alcoholysis products of lanolin and polyoxyethylene ethers of polyhydric alcohol. The latter are prepared by heating together lanolin and polyoxyethylene ethers of polyhydric alcohols. These products are either soluble in water or emulsify in water to form oil-in-water emulsion. These products are prepared by heating together 1 part by weight of lanolin and about 0.5 to 6 parts by weight of polyhydric alcohol oxyethylene ether. The amount of the latter should not exceed 2.5 mols per mol of lanolin. Among the polyhydric alcohol which can be used in the preparation of the ether are ethylene glycol, propylene glycol, glycerol, sorbitol, sorbitan, manitol and mannitan. In general, polyhydric alcohols which may contain as many as 6 carbon atoms per molecule and at least two-thirds as many hydroxyl radicals as carbon atoms may be used. The mol proportion of ethylene oxide radicals to hydroxyl radicals in the polyhydric alcohol should be between 0.5 and about 20.

These lanolin derivatives are non-hygroscopic and function entirely different from compounds such as glycerine and sorbitol. The preparation of the lanolin alcoholysis products is described in more detail in U.S. Patent 2,478,820. The preparation of the reaction products of ethylene oxide and lanolin is described in more detail in U.S. Patent 1,970,578. These plasticizers may be used in concentrations of from 5% to 50% their weight based on the dry weight of the gelatin. Concentrations ranging from 25% to 35% per dry weight of gelatin are preferred.

In carrying out the invention, a film support, preferably of the transparent type such as those prepared from a cellulose ester, from polystyrene or from a polycarbonate is provided with a suitable subbing layer and coated with a light-sensitive silver halide emulsion layer. The emulsion layer is then overcoated with a gelatin solution which contains the lanolin ethylene oxide condensation product or the alcoholysis products of lanolin and polyoxyethylene ethers of polyhydric alcohol to provide a surface layer. Suitable aliphatic hardening agents such as formaldehyde, glyoxal or mucochloric acid can be added to the surface layer. The latter acts not only as a protective layer which prevents ferrotyping, but also increases appreciably the flexibility of the whole film. This increased flexibility and decreased brittleness is especially important for motion picture films or other film materials such as aerial film which is used at low humidity under conditions of mechanical stress.

The degree of brittleness was determined by subjecting the film to practical tests, for instance, by running a film under conditions of extreme low humidity such as 12 to 13% relative humidity and at a temperature of about 30° through a motion picture camera. Quantitative results were obtained by using the testing procedure described in an article by P. Z. Adelstein entitled "Brittleness Tests for Photographic Film" which was published in Photographic Science and Engineering, volume 1, No. 2, pages 63 to 68, October 1957. In these tests, all samples were conditioned at 10 to 15% relative humidity and a temperature of 25° C. Relatively higher values indicate greater brittleness and vice versa.

The advantages of my invention are especially pronounced with color materials including color films and papers which contain color formers fast to diffusion. Such materials are prepared according to the methods described in U.S. Patents 2,179,228, 2,179,239, 2,186,849 and 2,220,187 and consist of several integral emulsion layers coated on a clear cellulose ester film base, opaque base or paper. Each of the emulsions is sensitized to one of the primary colors of light, namely, blue, green, and red. Usually, the top layer is blue sensitive, the middle layer is green sensitive, and the bottom layer is red sensitive. Each of the three silver halide emulsion layers contain dye-forming compounds fast to diffusion.

During the development of the silver image by an aromatic amino developing agent, these dye-forming compounds unite with the oxidation products of the developing agent to form an azomethine or indoaniline dye. Alternatively, the emulsion layer may be free from color formers, in which case the film is processed with the color formers in the color developers as described in U.S. Patents 1,897,866, 1,900,870, 1,928,709 and 1,980,941.

Multicolor film in which each element bears a color yielding layer comprising a hydrophilic film-forming synthetic polymer containing a plurality of hydroxyl groups and having a plurality of color components and, in addition, containing light-sensitive silver salts is described in U.S. Patents 2,397,864, 2,397,865, 2,397,866 and 2,397,867.

Materials in which the developed pictures are a phenazonium dye image formed by development with a 1,2,4-triamino-benzene developer are described in U.S. Patents 2,486,440 and 2,570,116.

The invention is illustrated by the accompanying drawing which shows in cross section a stripping film carrying on the support 10, a subbing layer 11, an emulsion layer 12 and a gelatin layer 13 containing the alcoholysis product of lanolin and the polyoxyethylene ether of a polyhydric alcohol.

While the following examples describe in detail the methods for accomplishing the aforestated objects, it is to be understood that they are given merely for the purpose of illustration and are not to be construed as limiting the scope of the invention.

*Example I*

A film of the type used in aerial photography and having a high acetyl cellulose acetate base which is subbed in the conventional manner and coated with a high-speed silver bromoiodide emulsion was overcoated with a solution which was prepared by adding to 100 milliliters of a 5% by weight gelatin solution, 100 milliliters of a dispersion which contained 15 grams of the reaction product of lanolin and the oxyethylene ether of sorbitol obtained in accordance with the procedure of Example I of U.S. Patent 2,478,820. A comparison test was carried out utilizing 100 milliliters of a 5% gelatin solution which was diluted with 100 milliliters of water to yield a 2.5% solution. Both film samples were tested in a 16 mm motion picture camera at a temperature of 30° C. and a relative humidity of 10% by running the film through the camera until brittleness caused the film to break. It was established that the film having the surface layer containing the lanolin reaction product showed less brittleness than the type which contained only gelatin in the surface layer.

By submitting the two samples to the Adelstein's brittleness tests at 10% relative humidity and 25° C., the following values were obtained.

|  | Vise | Wedge |
|---|---|---|
| Lanolin Derivative | .022<br>.025 | .26<br>.27 |
| Control | .270<br>.280 | .38<br>.37 |

*Example II*

Example I was repeated with the exception that the lanolin reaction product used was prepared by the reaction of lanolin with the oxyethylene ether of glycerol prepared in accordance with Example VII of U.S. Patent 2,478,820. The film provided with the overcoating containing the lanolin reaction product showed superior flexibility and decreased brittleness when compared with a type film which contained only a plain surface gelatin layer.

*Example III*

A multilayer color film carrying on a transparent support three emulsion layers containing color formers fast to diffusion was overcoated with a gelatin layer containing the reaction product of lanolin and ethylene oxide prepared in accordance with Example XXI of U.S. Patent 1,970,578. This film showed less brittleness and better flexibility than an otherwise identical color film which had been overcoated with a plain gelatin layer.

While the invention has been described with reference to certain specific examples and procedures, it is not confined to the precise embodiments herein set forth, but intended to cover such modifications as may come within the scope of the appended claims.

I claim:
1. A photographic element comprising a flexible support carrying in that order a subbing layer, a light-sensitive silver halide gelatin emulsion layer and in contiguous contact with said emulsion layer a surface layer comprising gelatin as a colloidal carrier material having uniformly dispersed therein as a plasticizer therefor, the reaction product of lanolin and ethylene oxide, the amount of reaction product present in the surface layer ranging from 5 to 50% based on the dry weight of the gelatin.

2. A light-sensitive photographic material comprising a flexible support carrying in the following order a subbing layer, a light-sensitive gelatin silver halide emulsion layer and in contiguous contact with said emulsion layer a surface layer comprising gelatin having uniformly dispersed therein from 5 to 50% based on the dry weight of gelatin of a lanolin product comprising the alcoholysis product of lanolin and a polyhydric alcohol oxyethylene ether, each base polyhydric alcohol in said ether containing no more than 6 carbon atoms per molecule, and at least two-thirds as many hydroxyl groups per molecule as carbon atoms, the mol proportion of ethylene oxide radical to hydroxyl radical in said polyhydric alcohol being between about 0.5 and about 20, and the weight of oxyethylene ether being between about 0.5 and about 6 times the weight of lanolin, but the mol proportion of oxyethylene ether per mol of lanolin being not more than about 2.5.

3. A photographic material according to claim 2 wherein the amount of plasticizer present in the layer is on the order of 30% based on the dry weight of the gelatin.

4. A photographic material according to claim 2 wherein the polyhydric alcohol oxyethylene ether is selected from the group consisting of oxyethylene ethers of ethylene glycol, propylene glycol, glycerine and sorbitol.

No references cited.

NORMAN G. TORCHIN, *Primary Examiner.*